US012771712B2

(12) United States Patent
Linz

(10) Patent No.: US 12,771,712 B2
(45) Date of Patent: Oct. 20, 2026

(54) SESSION MATURITY MODEL WITH TRUSTED SOURCES

(71) Applicant: Microsoft Technology Licensing, LLC, Redmond, WA (US)

(72) Inventor: Raymond Keith Linz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 17/539,866

(22) Filed: Dec. 1, 2021

(65) Prior Publication Data

US 2022/0094712 A1 Mar. 24, 2022

Related U.S. Application Data

(63) Continuation of application No. 16/222,766, filed on Dec. 17, 2018, now Pat. No. 11,218,506.

(51) Int. Cl.

| | |
|---|---|
| ***H04L 9/40*** | (2022.01) |
| ***H04L 47/19*** | (2022.01) |
| ***H04L 47/2441*** | (2022.01) |

(52) U.S. Cl.

CPC .......... *H04L 63/1458* (2013.01); *H04L 47/19* (2013.01); *H04L 47/2441* (2013.01); *H04L 63/1416* (2013.01); *H04L 63/1425* (2013.01)

(58) Field of Classification Search

CPC ............. H04L 63/1458; H04L 63/1416; H04L 63/1425; H04L 63/0227; H04L 63/0236; H04L 63/1408

See application file for complete search history.

(56) References Cited

U.S. PATENT DOCUMENTS

| | | | | |
|---|---|---|---|---|
| 9,924,516 B1 | | 3/2018 | Naim | |
| 2002/0120720 A1 | * | 8/2002 | Moir | H04L 41/5022 709/223 |
| 2008/0175146 A1 | * | 7/2008 | Van Leekwuck | H04L 47/11 370/230 |

(Continued)

FOREIGN PATENT DOCUMENTS

| | | |
|---|---|---|
| CN | 101446970 A | 6/2009 |
| CN | 107241219 A | 10/2017 |

(Continued)

OTHER PUBLICATIONS

"First Office Action Issued in Indian Patent Application No. 202147026960", Mailed Date: Jan. 11, 2023, 5 Pages.

(Continued)

*Primary Examiner* — Beemnet W Dada
*Assistant Examiner* — Sayeda Salma Nahar
(74) *Attorney, Agent, or Firm* — Ray Quinney & Nebeker P.C.; John O. Carpenter

(57) ABSTRACT

Aspects of the present disclosure disclose provide systems and methods for performing session maturity modeling and tracking to aid in the identification of network traffic that should and/or should not be subjected to DOS mitigation mechanisms. More specifically, based on a maturity status of identification information associated with a communication, a communication may bypass high traffic mitigation mechanisms such as packet rate and connection rate limitations.

20 Claims, 14 Drawing Sheets

(56) References Cited

U.S. PATENT DOCUMENTS

2009/0113517 A1* 4/2009 Engdahl .............. H04L 63/0254 726/1
2015/0264083 A1* 9/2015 Prenger ................ G06F 16/285 726/23
2018/0351930 A1* 12/2018 Kim ...................... H04L 63/101

FOREIGN PATENT DOCUMENTS

| | | | |
|---|---|---|---|
| CN | 107241224 | A | 10/2017 |
| JP | 2004120498 | A | 4/2004 |
| JP | 2006203537 | A | 8/2006 |
| JP | 2006352274 | A | 12/2006 |
| JP | 2009239525 | A | 10/2009 |
| JP | 2017157963 | A | 9/2017 |

OTHER PUBLICATIONS

"Notice of Allowance Issued in Chinese Patent Application No. 201980083896.5", Mailed Date: May 24, 2023, 4 Pages.
"Office Action Issued in European Patent Application No. 19828012.5", Mailed Date: Jun. 21, 2023, 5 Pages.
"First Office Action and Search Report Issued in Chinese Patent Application No. 201980083896.5", Mailed Date: Oct. 31, 2022, 14 Pages.
Office Action Received for Japanese Application No. 2021-534934, mailed on Feb. 9, 2024, 12 pages (English Translation Provided).
Office Action Received for Japanese Application No. 2021-534934, mailed on Jun. 24, 2024, 11 pages. (English Translation Provided).
Hearing Notice Received for Indian Application No. 202147026960, mailed on Jun. 27, 2024, 02 pages.
Intimation to grant received for Indian Application No. 202147026960, mailed on Oct. 14, 2024, 01 Page.
Notice of Allowance Received for Korean Application No. 10-2021-7018575, mailed on Feb. 27, 2025, 03 pages. (English Translation Provided).
Office Action Received for Korean Application No. 10-2021-7018575, mailed on Dec. 6, 2024, 6 pages. (English Translation Provided).
Communication under Rule 71(3) received for European Application No. 19828012.5, mailed on Apr. 23, 2026, 07 Pages.
Decision to Grant a European Patent Pursuant to Article 97(1) Received for European Application No. 19828012.5, Mailed on Jul. 30, 2026, 2 Pages.

* cited by examiner

SESSION MATURITY MODEL WITH TRUSTED SOURCES

CROSS-REFERENCE TO RELATED APPLICATIONS

This application is a continuation application of U.S. patent application Ser. No. 16/222,766, filed Dec. 17, 2018, the entire disclosure of which is hereby incorporated herein by reference.

BACKGROUND

Current high volume network traffic used in denial of service (DOS) attacks result in resource exhaustion problems for hosts and further exhausts connection bandwidth. Existing connection rate limiting and packet rate limiting solutions designed to thwart DOS attacks include the ability to identify the presence of an attack, route traffic to an appliance, and then arbitrarily drop new connection attempts or packets. However, as all traffic is treated equally, the result of performing standard connection rate limiting and packet rate limiting impacts all customers currently utilizing a resource experiencing the attack. While arbitrarily dropping connection attempts and packets does allow an impacted resource to recover quickly, the randomness of the drops does not take into account differences between nefarious and non-nefarious traffic; that is, current solutions make little to no determination as to what traffic should be affected when performing DOS mitigation.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods that provide the ability to establish and track session maturity for network traffic and subject immature traffic to limitations set by DOS protection mechanisms, such as connection and/or packet rate limiting mechanisms. Moreover, as traffic becomes mature, such mature traffic may circumvent DOS protection mechanisms altogether. For example, as known endpoints, such as client devices, establish valid communication sessions with a protected resource, the known endpoints may be whitelisted, temporarily and/or permanently, or otherwise designated as a known good communication endpoint; thus, not being subjected to DOS protection mechanisms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
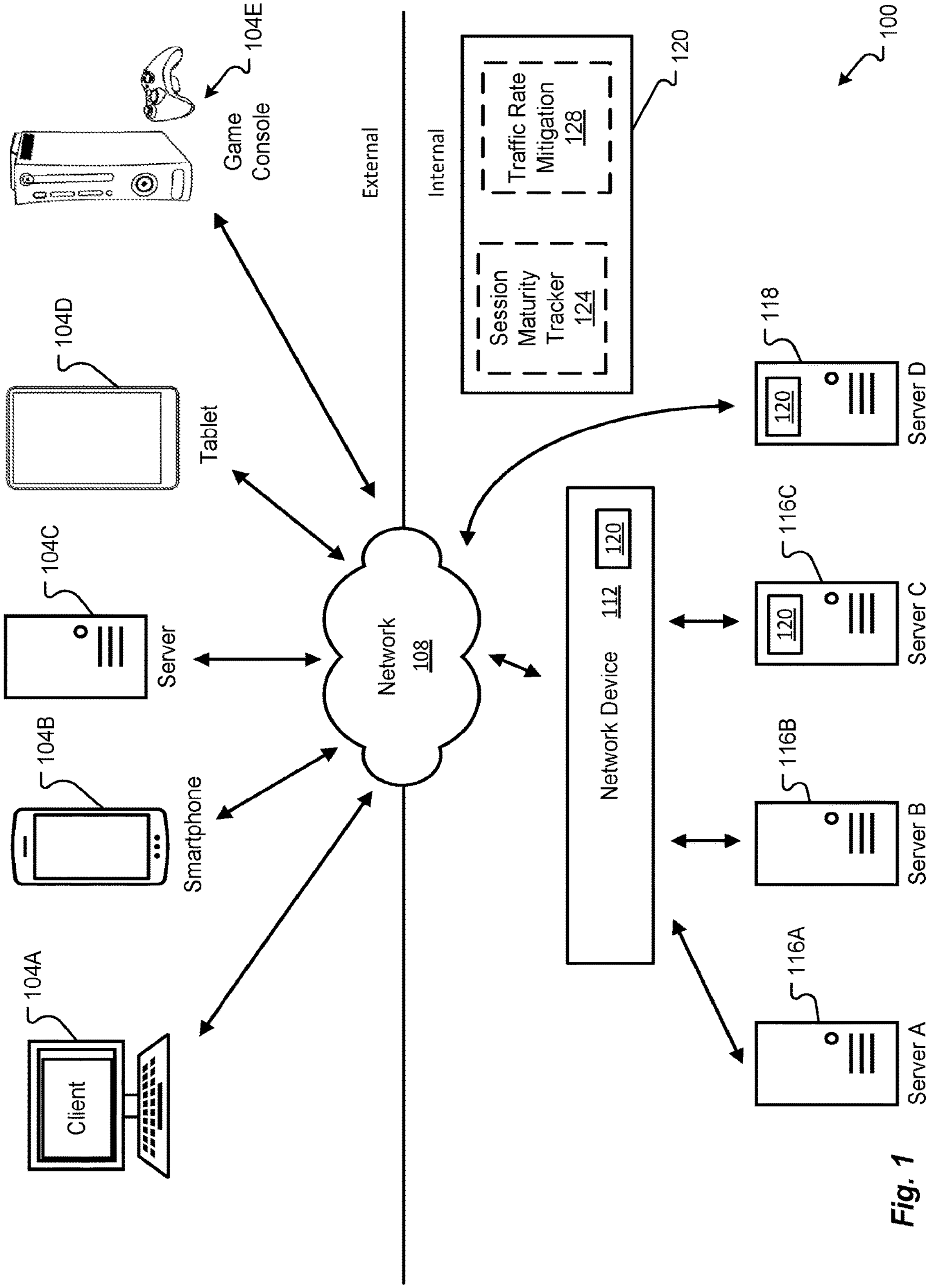
FIG. 1 illustrates details of a session maturity modeling and tracking system in accordance with the aspects a of the disclosure.

The above specification, examples and data provide a complete description of the manufacture and use of the composition of the invention. Since many aspects of the invention can be made without departing from the spirit and scope of the invention, the invention resides in the claims hereinafter appended.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In accordance with aspects of the present disclosure, communications between endpoints may be subjected to session maturity modeling and tracking to aid in the identification of network traffic that should and should not be subjected to DOS mitigation mechanisms. Typical communication sessions involve a first endpoint, such as a client device, sending a communication, request, packet, information, or otherwise to a second endpoint, such as a host device. The host device may then respond to the client device by sending a follow-up communication that may include a packet, acknowledgement, and/or other information. Following the receipt of the communication from the host device, the client device may further send another communication to the host device acknowledging that the communication from the host device was received, thereby establishing a communication session. Of course, additional communications may take place prior to the establishment of the communication session; however, regardless of the number of communications required to establish a communication session, such communications may be said to be maturing, or are in the process of becoming a mature communication session, as the number of initial communications between the client device and host device occur. Once the communication session has been established, the session may be said to be mature. Mature sessions, that is, sessions involving intended, valid, or otherwise wanted communications, may be tracked such that these matured communication sessions are not subject to the same types of DOS mitigation techniques that may be applied to non-mature communications. By determining which communication sessions should be subject to further scrutiny, such as packet rate limiting and/or connection rate limiting, resource utilization at a host device may be reduced. Moreover, by subjecting network traffic to session maturity modeling and/or tracking, a large portion of initial communication requests may be prevented from reaching a resource, such as a server, host, or otherwise; thus, resource utilization at the server, host, or otherwise may be reduced.

In accordance with aspects of the present disclosure, rather than requiring a communication session to be established, communications between the client device and host device may be subjected to session maturity modeling. For example, communications over user datagram protocol (UDP) may involve information being transmitted from a host device to a client device without an established communication connection process. Accordingly, a client device may request information in a communication sent to a host device. The host device may respond to the client device by sending the requested information in a response communication. The maturity of the communication between the client device and host device may be based on the number of communications occurring between the client device and host device. In some examples, the maturity of the communication between the client device and host device may be based on the number of communications occurring between the client device and host device within a specified period of time.

Referring now to FIG. 1, components of a configuration of a session maturity modeling and tracking system 100 is depicted in accordance with an aspect of the present disclosure. The session maturity modeling and tracking system 100 may be initially divided into an external portion and an internal portion. The external portion may include one or more endpoints/computing devices/client devices, such as a client device 104A, smartphone 104B, server 104C, tablet 104D, and/or game console 104E, coupled to a network 108. While examples of computing devices are provided above, it should be understood that the computing devices 104A-E can be any type of computing device. As another non-limiting example, at least one computing device 104A-E may be any device configured to allow a user to use an application such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other Internet of Things (IOT) devices. The network 108, likewise, may be any kind of network interconnection such as a local area network (LAN), a wide area network (WAN), a wireless LAN (WLAN), the Internet, one or more communication channels, etc.

The session maturity modeling and tracking system 100 may additionally include an internal portion; the internal portion may include one or more computing devices, such as one or more servers 116A-C and/or servers 118. The internal portion of the session maturity modeling and tracking system 100 further includes any network portion or resources intended to be protected from a DOS type of attack or other high volume network traffic attack. Moreover, the one or more servers 116A-C may establish a communication session with one or more of the computing devices 104A-E, provide content to the one or more computing devices 104A-E, and/or receive content from the one or more computing devices 104A-E, utilizing the network 108 and network device 112. The network device 112 may be any network device capable of receiving and forwarding network traffic. That is, the network device 112 may be a network switch that connects devices together on a computer network by using packet switching to receive, process, and forward data to the destination device. Accordingly, a computing device 104A-E may communicate with a computing device 116A-C utilizing the network 108 and the network device 112. The network device 112 may be configured to track session maturity and/or perform DOS mitigation techniques. For example, the network device 112 may include a session maturity tracker 124 and/or a traffic rate mitigation module 128 as part of a communication module 120. Alternatively, or in addition, session maturity tracking may be performed by the network device 112 and DOS or other traffic rate mitigation and/or shaping techniques may be performed utilizing a different network device, such as server 116C or vise versa. As depicted in FIG. 1, the network 108 may straddle the external and internal network; thus, one or more portions of the network 108 may be considered internal. As another example, the network 108 may include a router coupled to a wide area network (WAN) and also coupled the network device 112 and/or server D 118; the WAN side of the router is generally considered to be an external side while a local area network (LAN) side of the router is generally considered to be an internal side.

Figure 2A:
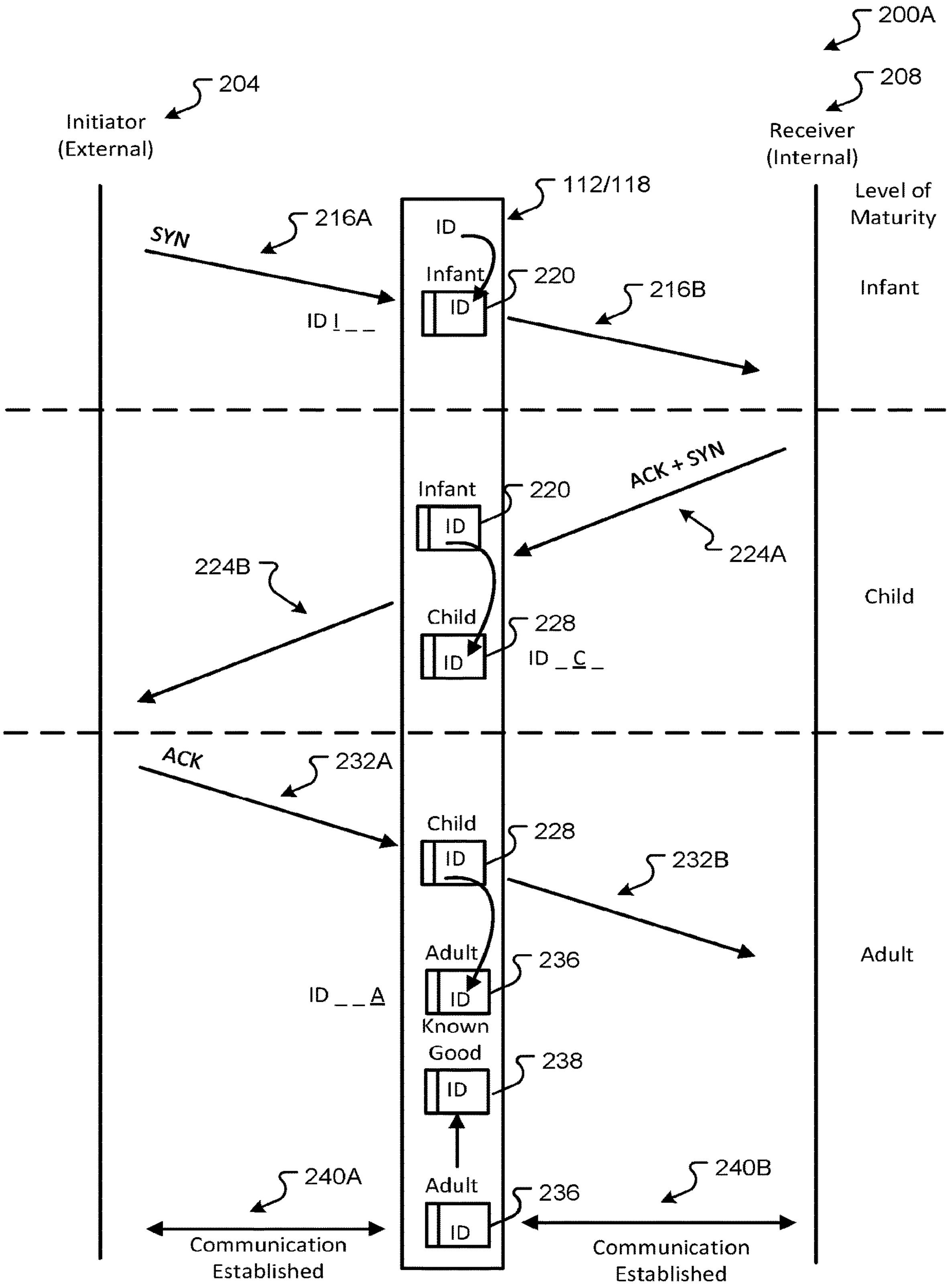
FIGS. 2A-2C illustrate additional details related to session maturity modeling and tracking in accordance with the aspects of the disclosure.

Turning now to FIG. 2A, details of a session maturity modeling and tracking system 100 are provided in accordance with a connection establishment process 200A. The connection establishment process 200A may be conducted between one or more of the computing devices 104A-E and one or more of the host/computing devices 116A-C and 118. The connection establishment process 200A may be performed at least partially by the session maturity tracker 124 and/or a traffic rate mitigation module 128. The connection establishment process may refer to a handshake process, such as the three-way handshake used in TCP. As previously discussed, a network device 112 may reside between the one or more of the computing devices 104A-E (initiators 204) and one or more of the host/computing devices 116A-C. While a TCP connection establishment process is depicted in FIG. 2A, it should be understood that other connection establishment processes may be utilized without departing from the spirit and scope of the present disclosure. Moreover, it should be understood that any communications between an initiator and receiver may be used to determine a communication maturity classification; that is, communications between a send and a receiver may be used to determine a maturity of the communications occurring between the send and receive.

As depicted in FIG. 2A, an initiator 204, such as a computing device 104A-E, may transmit an initial communication 216 to the receiver 208, such as a host/computing device 116A-C, where the initiator 204 is external to the receiver 208 as previously described. Thus, the initial communication 216 may be transmitted as a first instance 216A and received at a network device 112. The network device 112, upon determining that the received communication 216A is from an external source, may classify this initial communication 216A as having a maturity status of "infant," "child," and/or "adult." Such classification may be performed by checking one or more tables for identifying information matching the initial communication 216, and if none is found, inserting information about the initial communication 216 into a table, database, or other location storing information. Non-limiting examples of information specifically identifying the initiator 204 include an IP address of the initiator 204, a source port utilized by the initiator 204, and/or a protocol utilized by the initiator 204. Such information may be included in the initial communication 216A. Thus, the network device 112, upon determining that the received communication 216A is from an external source, may determine if information included in the initial communication 216A matches any identifying information in the infant table 220. If such information does not exist in the infant table 220, the network device 112 may classify this initial communication 216A as having a maturity status of "infant." Such classification may be performed by inserting information about the initial communication 216 into an infant table 220. That is, ID information including, for example, an IP address of the initiator 204 device, source port, and protocol may be inserted into the infant table 220. Alternatively, or in addition, the network device 112 may insert the identifying information of the initiator 204 into a single tracking table, database, or otherwise, where the information inserted is representative of the maturity status of the communication and/or communication session. As depicted in FIG. 2A, "ID I _ _" may indicate that the identifying information is of infant status. Rather than utilizing different tables to track different maturity statuses of a communication, a single table may be utilized, where information indicative of the maturity status is associated with the identifying information. For purposes of illustrating maturity, the status of infant, child, and adult is used throughout this disclosure. However, additional statuses and/or status types are herein contemplated. For example, other non-limiting examples of the statuses may include levels 0, 1, 2, 3, 4, and/or 5; initial, intermediate, and established; first, second, third, and fourth, etc. Upon adding the tuple of information to the infant table 220, the network device 112 may forward on the initial communication 216B to the receiver 208.

Upon receiving the initial communication 216 from the network device 112 as initial communication 216B, the receiver 208 may provide an acknowledgement communication 224 back to the initiator 204. Accordingly, the receiver 208 may send an acknowledgement communication 224 to the initiator 204. Thus, the network device 112 may receive the acknowledgement communication 224A from the receiver 208 as acknowledgement communication 224A and determine if information included in the acknowledgement communication 224A matches any identifying information in the infant table 220. During a connection establishment process, if information in the acknowledgement communication 224A matches identifying information, such as an IP address of the initiator 204 stored in the infant table 220, the network device 112 may proceed to remove the tuple of information about the initiator 204 from the infant table 220 and put such information into a child table 228. Alternatively, or in addition, the network device 112 may insert the identifying information of the initiator 204 into the single table, database, or otherwise, where the information inserted is representative of the maturity status of the communication and/or communication session. Rather than utilizing different tables to track different maturity statuses of the communication, the single table may be utilized, where information indicative of the maturity status is associated with the identifying information. As depicted in FIG. 2A, "ID C" may indicate that the identifying information is of child status. The network device 112 may then forward the acknowledgment communication 224 to the initiator 204.

Upon receiving the acknowledgement communication 224 from the network device 206 as acknowledgement communication 224B, the initiator 204 may provide an acknowledgement communication 232 back to the receiver 208. Accordingly, the acknowledgement communication 232 may be received at the network device 112 as acknowledgment communication 232A. Thus, the network device 112, upon determining that the received communication 232A is from an external source, may determine if information included in the acknowledgement communication 232A matches any identifying information in either of the infant table 220 and/or the child table 228. During a connection establishment process, if information in the acknowledgement communication 232A matches identifying information, such as an IP address of the initiator 204 in the child table 228, the network device 112 may proceed to remove the tuple of information about the initiator 204 from the child table 228 and put such information into the adult table 236. Alternatively, or in addition, the network device 112 may insert the identifying information of the initiator 204 into the single table, database, or otherwise, where the information inserted is representative of the maturity status of the communication and/or communication session. Rather than utilizing different tables to track different maturity statuses of a communication, the single table may be utilized, where information indicative of the maturity status is associated with the identifying information. As depicted in FIG. 2A, "ID A" may indicate that the identifying information is of adult status.

Further, an identifier, such as an IP address of the initiator 204 may be placed in the known good table 238. The network device 112 may then forward the acknowledgment communication 232 to the receiver 208. Thus, upon receiving the acknowledgement communication 232 from the network device 112 as acknowledgement communication 232B, the communication may be determined to be mature and established such that information 240A and 240B may be transmitted and received. Accordingly, and as will be described, if subsequent communications from the initiator 204 are received at the network device 112 and destined for the receiver 208, the network device 112 may determine that information, such as an IP address, in the subsequent communication matches one or more pieces of the tuple information in the adult table 236 thereby allowing the subsequent communications to bypass any DOS protection mechanisms, thereby allowing established communication sessions to continue during and after deployment of the DOS protection mechanisms. If an incoming communication originates from the initiator 204 and matching information is not in the adult table 236, then DOS protection mechanisms may be applied to this incoming communication and subsequent communications from the same initiator.

In accordance with aspects of the present disclosure, the server D 118 in FIG. 1 may include the session maturity tracker 124 and/or a traffic rate mitigation module such that the server D 118 may be configured to track session maturity and/or perform DOS mitigation techniques. Accordingly, one or more computing devices 104A-E (initiators 204) and one or more of the host/computing devices 118 may communicate with one another, where a network device 112 does not track session maturity and/or perform DOS mitigation techniques. Accordingly, an initiator 204, such as a computing device 104A-E, may transmit an initial communication 216 to the host/computing device 118, where the initiator 204 is external to the host/computing device 118 as previously described. Thus, the initial communication 216 may be transmitted as 216A and received at the host/computing device 118, where the host/computing device 118 may be configured to track session maturity and/or perform DOS mitigation techniques. Thus, the host/computing device, upon determining that the received communication 216A is from an external source, may classify this initial communication 216A as having a maturity status of “infant,” “child,” and/or “adult.” Such classification may be performed by checking one or more tables for identifying information matching the initial communication 216, and if none is found, inserting information about the initial communication 216 into a table, database, or other location storing information. Non-limiting examples of information specifically identifying the initiator 204 include an IP address of the initiator 204, a source port utilized by the initiator 204, and/or a protocol utilized by the initiator 204. Such information may be included in the initial communication 216A. Thus, the host/computing device 118, upon determining that the received communication 216A is from an external source, may determine if information included in the initial communication 216A matches any identifying information in the infant table 220. If such information does not exist in the infant table 220, the host/computing device 118 may classify this initial communication 216A as having a maturity status of “infant.” Such classification may be performed by inserting information about the initial communication 216 into an infant table 220. That is, ID information including, for example, an IP address of the initiator 204 device, source port, and protocol may be inserted into the infant table 220. Alternatively, or in addition, the host/computing device 118 may insert the identifying information of the initiator 204 into a single tracking table, database, or otherwise, where the information inserted is representative of the maturity status of the communication and/or communication session. As depicted in FIG. 2A, “ID I _ _” may indicate that the identifying information is of infant status. Rather than utilizing different tables to track different maturity statuses of a communication, a single table may be utilized, where information indicative of the maturity status is associated with the identifying information. For purposes of illustrating maturity, the status of infant, child, and adult is used throughout this disclosure. However, additional statuses and/or status types are herein contemplated. For example, other non-limiting examples of the statuses may include levels 0, 1, 2, 3, 4, and/or 5; initial, intermediate, and established; first, second, third, and fourth, etc.

The host/computing device 118 may provide an acknowledgement communication 224 back to the initiator 204. Accordingly, the host/computing device 118 may send an acknowledgement communication 224 to the initiator 204. Thus, the host/computing device 118 may determine if information included in the acknowledgement communication 224B matches any identifying information in the infant table 220. During a connection establishment process, if information in the acknowledgement communication 224B matches identifying information, such as an IP address of the initiator 204 stored in the infant table 220, the host/computing device 118 may proceed to remove the tuple of information about the initiator 204 from the infant table 220 and put such information into a child table 228. Alternatively, or in addition, the host/computing device 118 may insert the identifying information of the initiator 204 into the single table, database, or otherwise, where the information inserted is representative of the maturity status of the communication and/or communication session. Rather than utilizing different tables to track different maturity statuses of the communication, the single table may be utilized, where information indicative of the maturity status is associated with the identifying information. As depicted in FIG. 2A, “ID _C_” may indicate that the identifying information is of child status.

Upon receiving the acknowledgement communication 224 from the host/computing device 118 as acknowledgement communication 224B, the initiator 204 may provide an acknowledgement communication 232 back to the host/computing device 118. Accordingly, the acknowledgement communication 232 may be received at the host/computing device 118 as acknowledgment communication 232A. Thus, the host/computing device 118, upon determining that the received communication 232A is from an external source, may determine if information included in the acknowledgement communication 232A matches any identifying information in either of the infant table 220 and/or the child table 228. During a connection establishment process, if information in the acknowledgement communication 232A matches identifying information, such as an IP address of the initiator 204 in the child table 228, the host/computing device 118 may proceed to remove the tuple of information about the initiator 204 from the child table 228 and put such information into the adult table 236. Alternatively, or in addition, the host/computing device 118 may insert the identifying information of the initiator 204 into the single table, database, or otherwise, where the information inserted is representative of the maturity status of the communication and/or communication session. Rather than utilizing different tables to track different maturity statuses of a communication, the single table may be utilized, where information indicative of the maturity status is associated with the identifying information. As depicted in FIG. 2A, “ID _ _A” may indicate that the identifying information is of adult status.

Further, an identifier, such as an IP address of the initiator 204 may be placed in the known good table 238 as previously discussed. Accordingly, and as will be described, if subsequent communications from the initiator 204 are received at the host/computing device 118, the host/computing device 118 may determine that information, such as an IP address, in the subsequent communication matches one or more pieces of the tuple information in the adult table 236 thereby allowing the subsequent communications to bypass any DOS protection mechanisms, and thereby allowing established communication sessions to continue during and after deployment of the DOS protection mechanisms. If an incoming communication originates from the initiator 204 and matching information is not in the adult table 236, then DOS protection mechanisms may be applied to this incoming communication and subsequent communications from the same initiator.

Figure 2B:
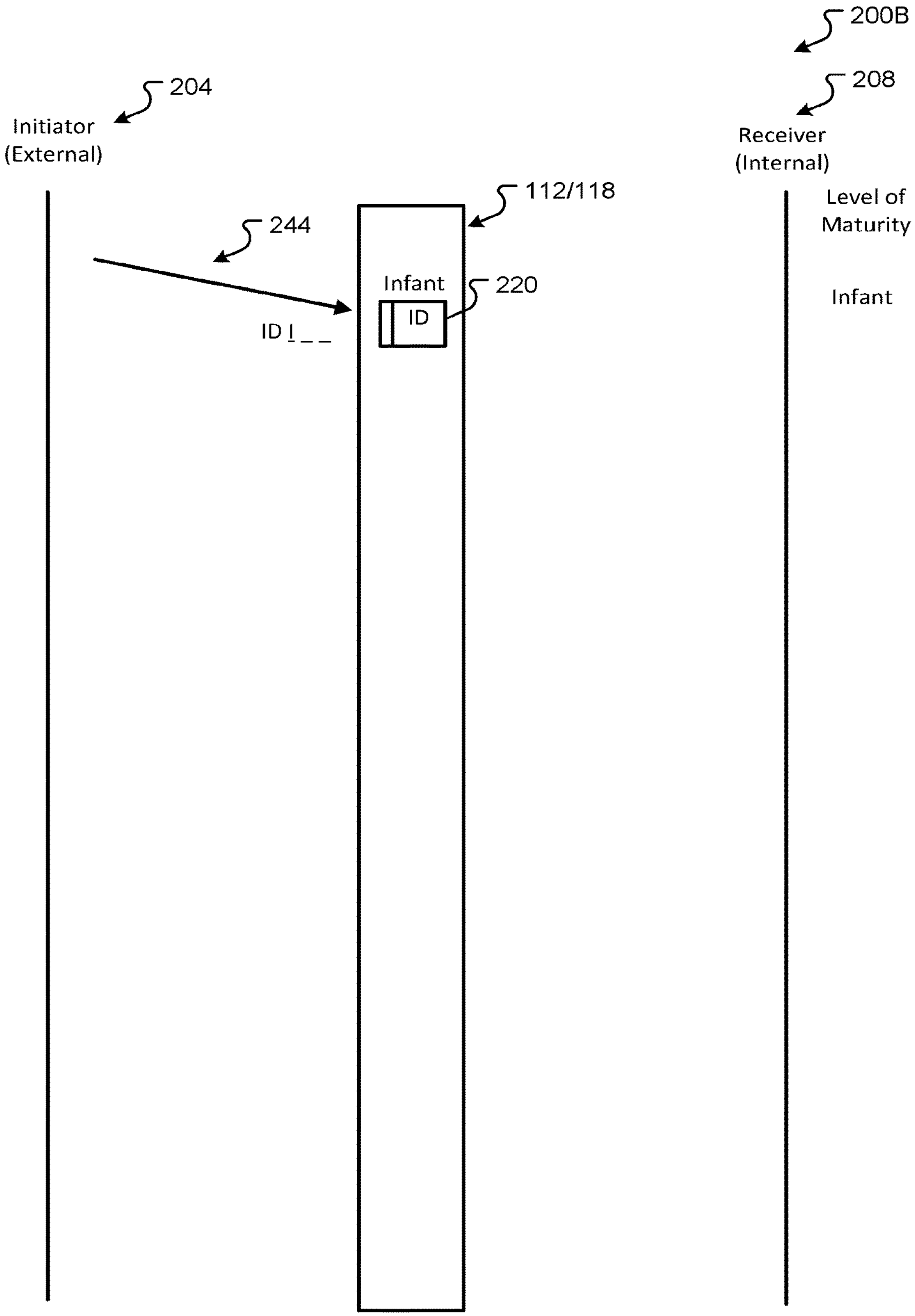

As illustrated in FIG. 2B, additional details of the session maturity modeling and tracking system 100 are provided in a communication diagram 200B. A communication 244 originating from an external source, such as the initiator 204, is received at the network device 112. The network device 112 may perform a check to determine if identifying information in the received communication 244 is found in the infant table 220. If such information is found in the infant table 220, but not in the child table 226 or adult table 238, then either the receiver 208 has not yet responded to a previous communication originating from the initiator 204 and/or the receiver 208 has no intention of responding. In instances where an initiator 204 sends multiple communication packets intended for the receiver 208 without a response, such as acknowledgement, from the receiver 208, the initiator may be acting in a nefarious manner as part of a DOS attack. Rather than passing the communication 244 and/or forwarding communication 244 to the receiver 208, the network device 112 may drop the communication 244 and/or store the communication 244 in a queue or other location for a specified period of time. After the specified period of time has elapsed, the network device 112 may check the infant table 220 again to determine if information matching that of the communication 244 is found. If so, the network device 112 may drop the communication 244. Otherwise, if the infant table 220 does not include information matching that of the communication 244, the network device 112 may proceed in a manner consistent with FIG. 2A as previously discussed.

Alternatively, or in addition a communication 244 originating from an external source, such as the initiator 204, is received at the host/computing device 118. The host/computing device may perform a check to determine if identifying information in the received communication 244 is found in the infant table 220. If such information is found in the infant table 220, but not in the child table 226 or adult table 238, then either the host/computing device 118 has not yet responded to a previous communication originating from the initiator 204 and/or the host/computing device 118 has no intention of responding. In instances where an initiator 204 sends multiple communication packets intended for the host/computing device 118 without a response, such as acknowledgement, from the host/computing device 118, the initiator may be acting in a nefarious manner as part of a DOS attack. Accordingly, the host/computing device 118 may drop the communication 244 and/or store the communication 244 in a queue or other location for a specified period of time. After the specified period of time has elapsed, the host/computing device 118 may check the infant table 220 again to determine if information matching that of the communication 244 is found. If so, the host/computing device may drop the communication 244. Otherwise, if the infant table 220 does not include information matching that of the communication 244, the host/computing device 118 may proceed in a manner consistent with FIG. 2A as previously discussed.

Figure 2C:
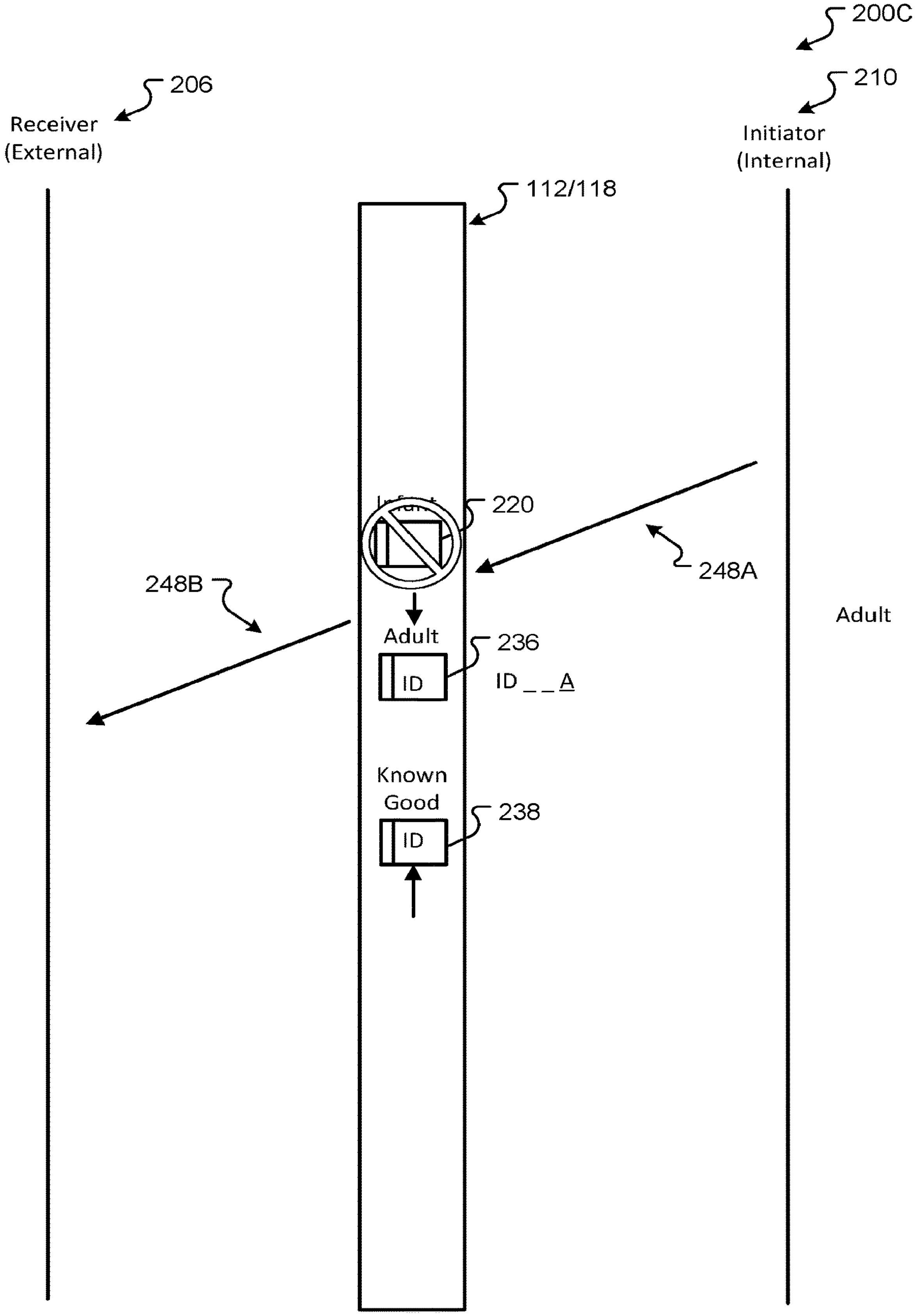

As illustrated in FIG. 2C, additional details of the session maturity modeling and tracking system 100 are provided in a communication diagram 200C. A communication 248A may originate from an internal device, such as the initiator 210, and be destined for the receiver 206. The initiator 210 may be a communication device residing within the internal network and the receiver may be a communication device that is external to the internal network as previously described with respect to FIG. 1. As the communication 248A originates internally, the network device 112 may check the infant table 220 to determine if the communication 248 is associated with a connection establishment process initiated by a communication device residing external to the network device 112, as described with respect to FIG. 1. If the communication 248A is not found in the infant table 220, the network device 112 may determine that the communication 248A is a first communication from the initiator 210 destined for the receiver 206. Accordingly, the network device 112 may insert an identifier, such as the destination IP address (e.g., IP address of the receiver 206) into the known good table 238. In addition, the network device 112 may insert a tuple of information for the receiver 206 into the adult table 236. Alternatively, or in addition, the network device 112 may insert the identifying information of the receiver 206 into a table, database, or otherwise, where the information inserted is representative of the maturity status of the communication and/or communication session. As depicted in FIG. 2C, ID "A" may indicate that the identifying information is of adult status.

Alternatively, or in addition, a communication 248A may originate from an internal device, such as the host/computing device 118, and be destined for the receiver 206. The host/computing device 118 may be a communication device residing within the internal network and the receiver may be a communication device that is external to the internal network as previously described with respect to FIG. 1. As the communication 248B originates internally, the host/computing device 118 may check the infant table 220 to determine if the communication 248 is associated with a connection establishment process initiated by a communication device residing external to the network device 112, as described with respect to FIG. 1. If the communication 248B is not found in the infant table 220, the host/computing device 118 may determine that the communication 248B is a first communication from the host/computing device 118 destined for the receiver 206. Accordingly, the host/computing device 118 may insert an identifier, such as the destination IP address (e.g., IP address of the receiver 206) into the known good table 238. In addition, the host/computing device 118 may insert a tuple of information for the receiver 206 into the adult table 236. Alternatively, or in addition, the host/computing device 118 may insert the identifying information of the receiver 206 into the single table, database, or otherwise, where the information inserted into a single location is representative of the maturity status of the communication and/or communication session. As depicted in FIG. 2C, ID "_ _A" may indicate that the identifying information is of adult status.

In some example, the session maturity modeling and tracking system 100 may utilize other parameters, in addition to or instead of a number of communications and/or if a determination as to whether a valid response has been received from a receiver, to determine a maturity status of a communication and/or a communication session. For example, a maturity status may be based on receiving a desired, predetermined, preconfigured, known, or otherwise intended response from a receiver and/or initiator. That is, in response to a communication that includes information of a specific type, a response including information of a specific type, status, or content may be expected; if such information is received, then the maturity status of the communication and/or the communication session may mature or otherwise be considered to be mature. As another example, in response to an initial request for certain information, if the requested information is received, then the maturity status of the communication and/or the communication session may mature or otherwise be considered to be mature. As another example, the maturity status may depend on some other type, content, or other parameter of a subsequent communication being present (for example, five exchanges before a certain port is used, or four exchanges before a certain type of content is sent/received). Accordingly, a maturity status may dependent on a desired number of exchanges before a desired port is utilized, thereby rendering the maturity status of the communication and/or communication session mature or otherwise altering a maturity status of the communication and/or communication session.

In accordance with some examples of the present disclosure, one or more maturity statuses may be bypassed or skipped based on a type of communication, content of the communication, and/or other parameter associated with the communication. For example, if an initiator initiated a communication and expected a response at a specific port and/or including specific content, the maturity status of the communication may bypass the child level and proceed directly to an adult level. In example where the content has been previously requested in other communication sessions, a unique value, such as a hash, of the requested content and/or a hash of a request for the requested content may be compared to hashes stored or otherwise associated with the content and/or the request for content. As the additional inspection of content and/or communication information, such as those in packet form, may require additional processing resources, the maturing model of a communication may be adjusted based on an availability of resources. For example, maturity of communications and/or communication session may be dependent on a set of parameters when throughput isn't high or otherwise less than a threshold. When throughput is high or otherwise greater than a threshold, the maturity of the communication and/or communication session may be dependent on a second different set of parameters.

Figure 3:
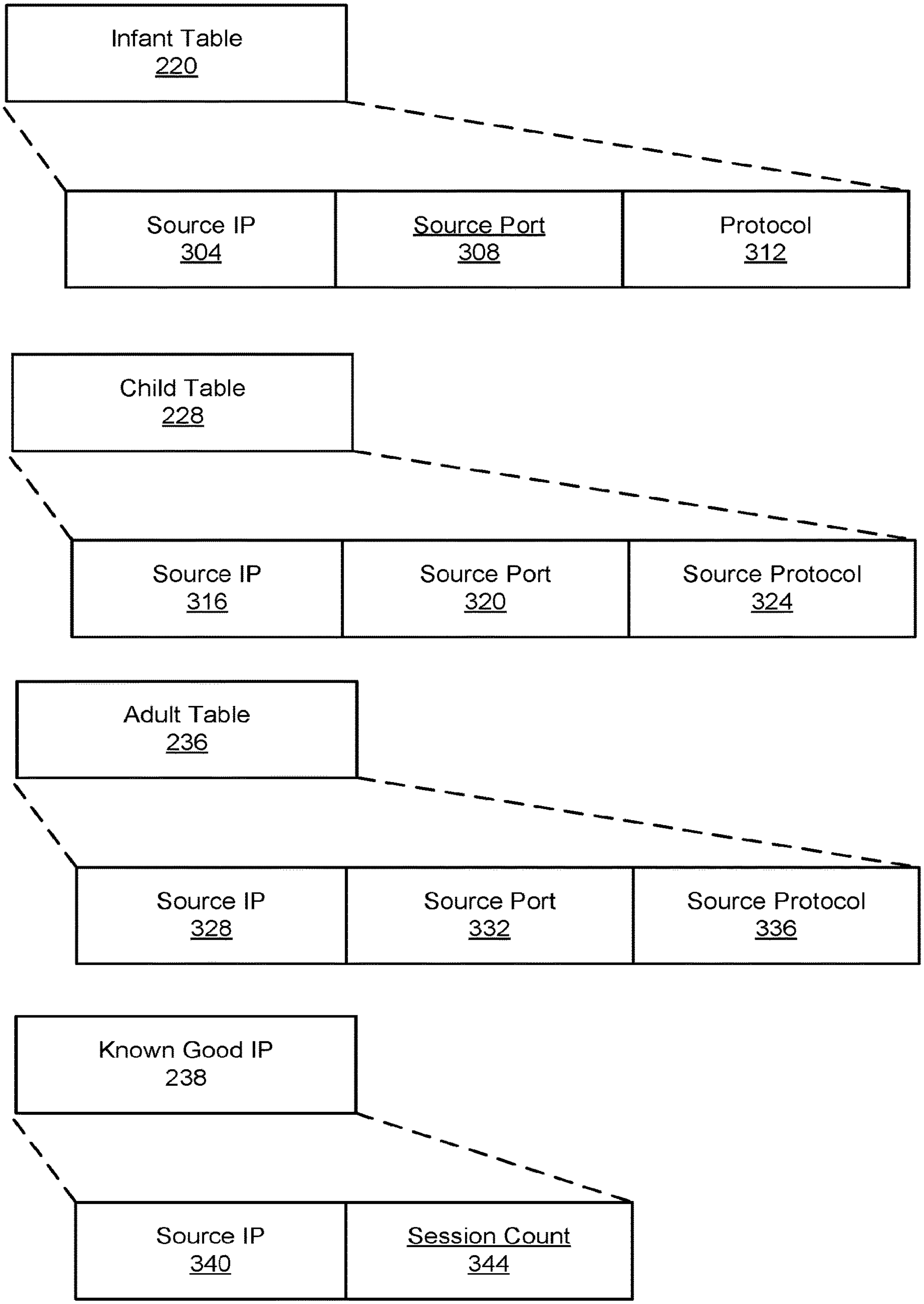
FIG. 3 illustrates an example configuration of an infant table, child table, adult table, and known good table in accordance with the aspects of the disclosure.

FIG. 3 depicts additional details of the infant table 220, child table 228, adult table 236, and known good IP table 238. As previously discussed, the infant table 220 may include a tuple of information for a resource that includes, but is not limited to a source IP 304, source port 308, and a protocol 312. Similarly, the child table 228 may include a tuple of information for a resource that includes, but is not limited to a source IP 316, source port 320, and a protocol 324. Further, the adult table 236 may include a tuple of information for a resource that includes, but is not limited to a source IP 304, source port 308, and a protocol 312. The known good IP table may include a source IP address 340, such as an IP address of an external computing device, and a session count 344. As will be discussed with respect to FIGS. 5A-7, the session count 344 may include an ongoing count of a quantity of communication session that have been established for an external IP address. In some instances, a decision as to whether to add the external IP address to the adult table 236 may be based on a number of communication sessions that include the external IP address in the known good IP table 238. Although specific items of information have been illustrated, more or fewer items of information may be included in each of the tuples depicted in FIG. 3. Each of the entries in the tables 220, 228, and 236 may be subject to an aging process and/or idle timeout such that entries are removed after a specified period of time and/or inactivity.

Figure 4:
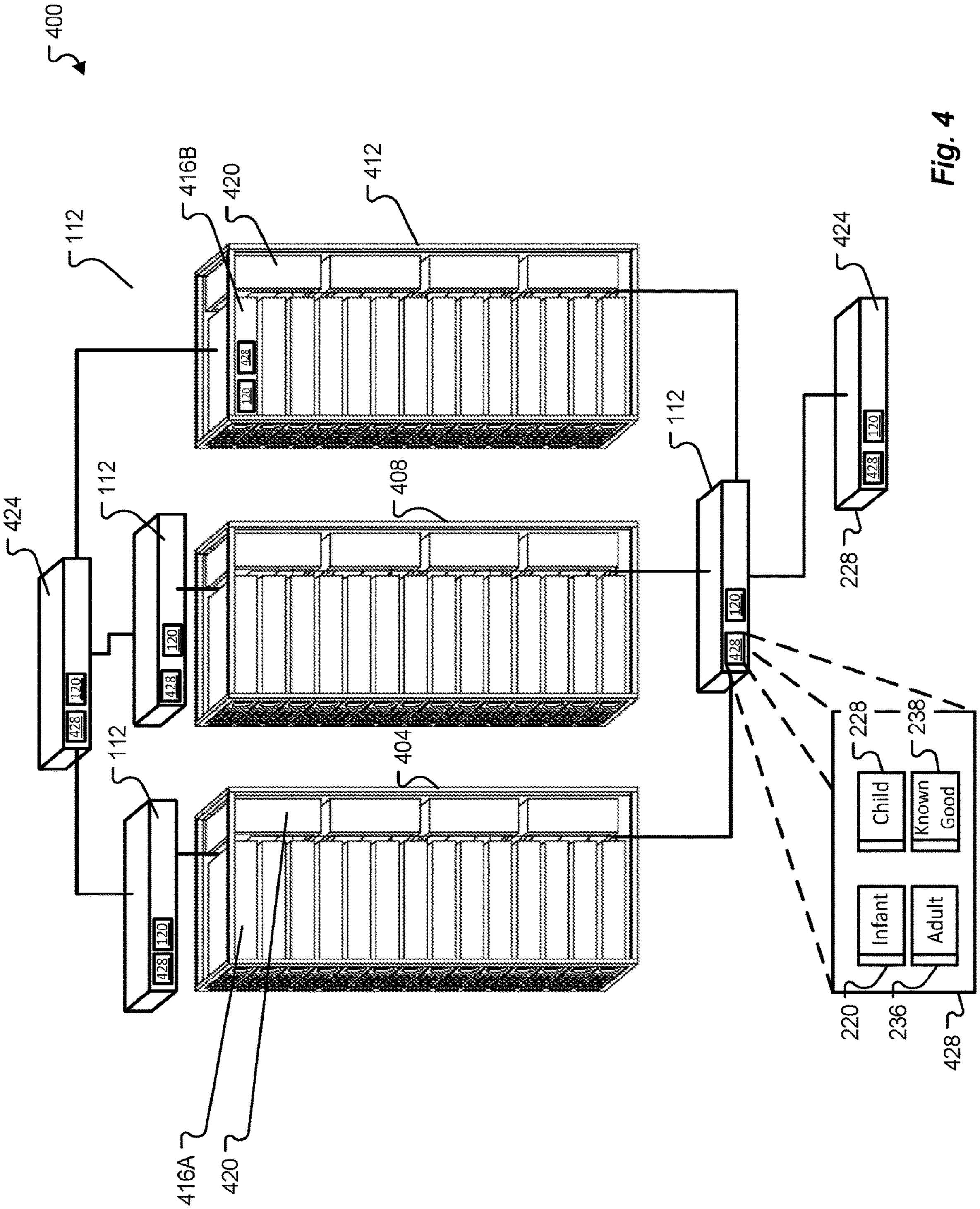
FIG. 4 illustrates additional details of a session maturity modeling and tracking system in accordance with the aspects of the disclosure.

Turning now to FIG. 4, an arrangement of a plurality of servers within a data center 400 is shown, in accordance with an aspect of the present invention. In some aspects, the data center 400 may include gaming servers or a stack of gaming consoles. The arrangement comprises rack 404, rack 408, and rack 412. Three racks are shown for the sake of simplicity; an actual implementation could include tens, hundreds, or thousands of racks deployed within a data center. Each rack 404, 408, and/or 412 may include a quantity of hosts, such as hosts 416, power distribution equipment, storage equipment, and/or networking equipment 420. The hosts 416 may be the same as or similar to the hosts/computing devices 116A-C and/or 118 as previously described. In one arrangement, a networking cable is run to the network device 112 at the top of, or within the rack. In accordance with aspects of the present disclosure, one or more networking devices may be dedicated to each rack. Alternatively, or in addition, one network device 112 may be dedicated to a plurality of racks, as further depicted at the bottom of FIG. 4. Each server in the rack then connects to the one or more network devices 112. In some aspects, one or more of the network devices 112 may be coupled to or otherwise in communication with another network device 424, where network device 424 may be another network device capable of communicating with a plurality of communication devices. For example, the network device 424 may be a router. In accordance with aspects of the present disclosure, each of the network device 112 and network device 424 may include a storage location 428. The storage location 428 may include the infant table 220, child table 228, adult table 236, and/or the known good table 238. Accordingly, a network device 424 may route traffic in accordance with information in the known good table, while the network device 112 may route traffic in accordance with information in the infant table 220, child table 228, adult table 236, and/or the known good table 238.

In accordance with aspects of the present disclosure, the rack 404, 408, and 412 may include a plurality of gaming consoles and/or a plurality of host/computing devices 416A configured to provide one or more services to a gaming console, such as gaming console 104E. As each gaming console and/or the plurality of host/computing devices 416A configured to provide one or more services to the gaming console is a specialized device that is not configured to track session maturity and/or perform DOS mitigation techniques, the gaming console and/or the plurality of host/computing devices 416A configured to provide one or more services to the gaming console may rely on another device, such as the network device 112, to track session maturity and/or perform DOS mitigation techniques. Accordingly, the gaming console and/or the plurality of host/computing devices 416A configured to provide one or more services to the gaming console may be communicatively coupled to the network device 112.

Figure 5A:
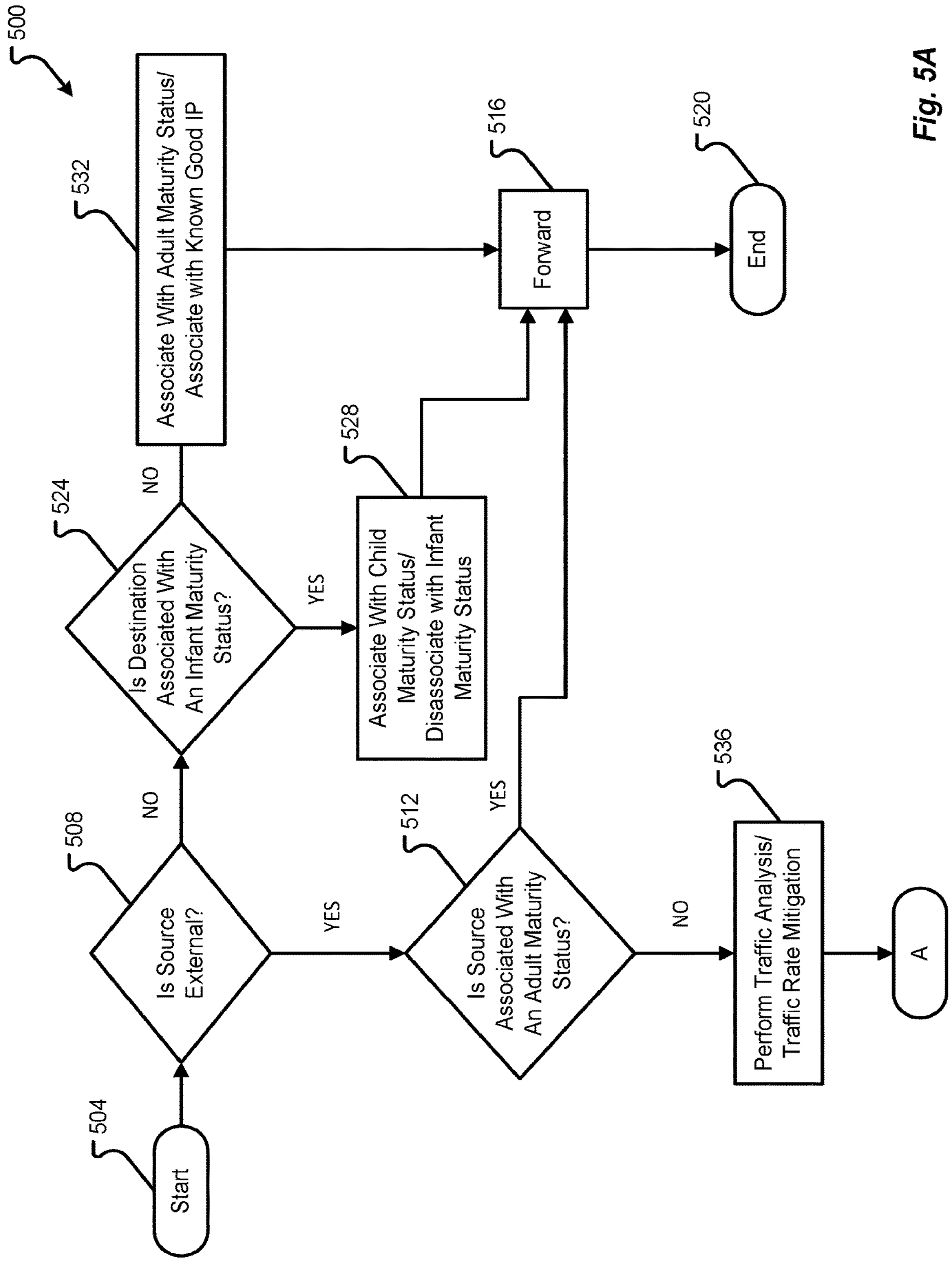
FIGS. 5A-5B illustrate a method for modeling and tracking session maturity in accordance with the aspects of the disclosure.
Figure 5B:
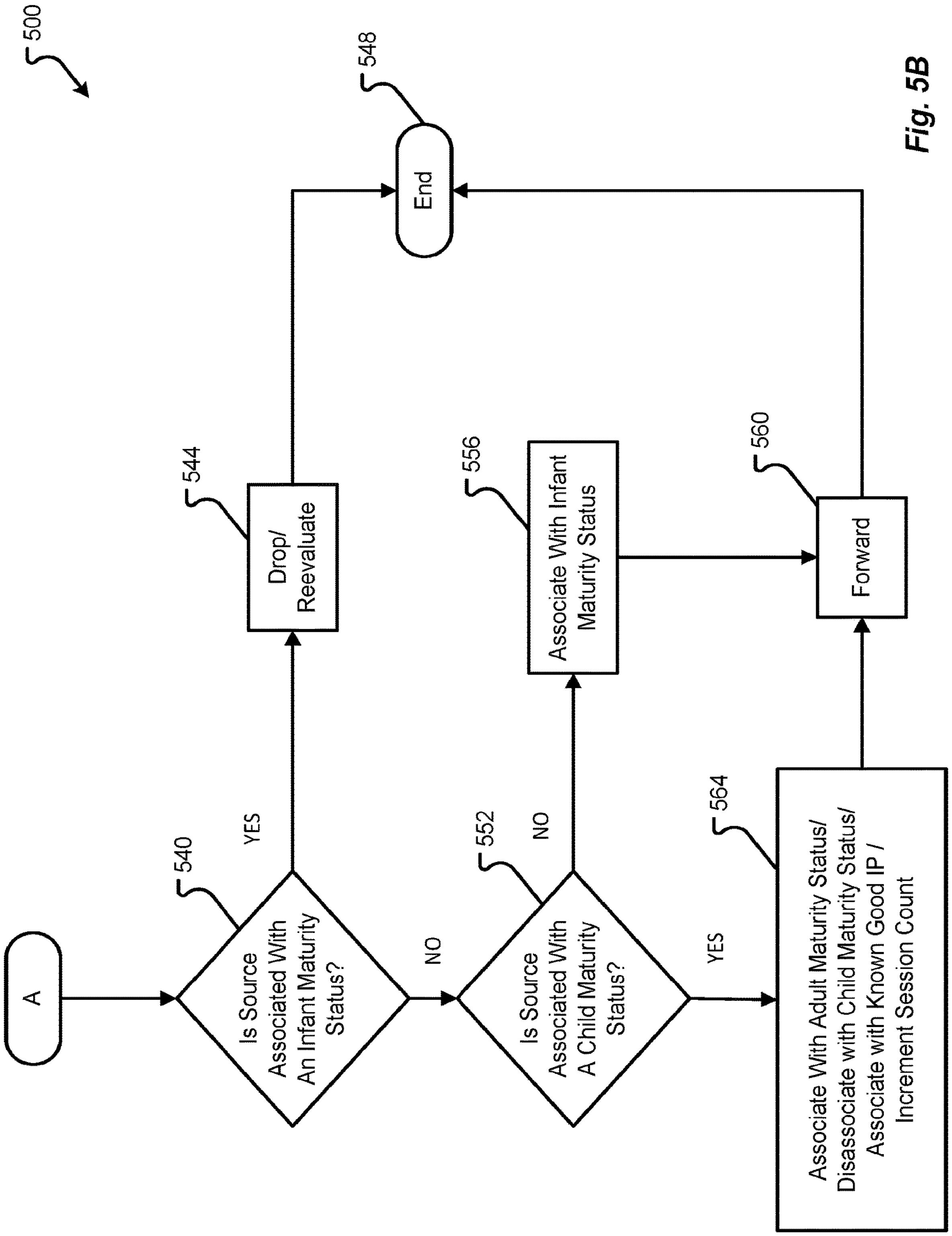

Alternatively, or in addition, the rack 404, 408, and 412 may include a plurality of gaming consoles and/or a plurality of host/computing devices 416B configured to provide one or more services to a gaming console, such as gaming console 104E. Each gaming console and/or the plurality of host/computing devices 416B configured to provide one or more services to the gaming console may be configured to track session maturity and/or perform DOS mitigation techniques; thus, the gaming console and/or the plurality of host/computing devices 416B may be communicatively coupled to another network device, such as network device 424. A method 500 for monitoring session maturity of communications may be as shown in FIGS. 5A and 5B. A general order for the steps of the method 500 is shown in FIGS. 5A and 5B. Generally, the method 500 starts with a start operation 504 and ends with an end operation 520. The method 500 can include more or fewer steps or can arrange the order of the steps differently than those shown in FIGS. 5A and 5B. The method 500 can be executed as a set of computer-executable instructions executed by a computer system and encoded or stored on a computer readable medium. Further, the method 500 can be performed by gates or circuits associated with a processor, Application Specific Integrated Circuit (ASIC), a field programmable gate array (FPGA), a system on chip (SOC), or other hardware device. Hereinafter, the method 500 shall be explained with reference to the systems, components, modules, software, data structures, user interfaces, etc. described in conjunction with FIGS. 1-4.

A communication may be received at step 508 where a device, such as the network device 112, may determine if the communication corresponds to a communication originating from a computing device that is external or internal to the network to be protected. Accordingly, if the communication is from an external computing device, such as a computing device 104A-104E, the method 500 may proceed to step 512 where an initial check of the adult table 236 may be performed. For example, the network device 112 may check the adult table 236 to determine if information in the received communication (such as an IP address), exists in the adult table 236. If identifying information of the communication matches information in the adult table 236 (i.e., the source is associated with an entry in the adult table 236 or otherwise associated with an adult maturity status), then the communication may be forwarded to the intended destination (e.g., an internal computing device) and the method 500 may end at step 520. That is, if identifying information is included in the adult table 236 that matches the identifying information in the received communication, the communication and subsequent connections may not be subjected to further traffic analyses and/or traffic rate mitigation at step 536.

If the source of the communication is determined to be internal at step 508, a check may be performed to determine if the intended destination exists in the infant table 220 or is otherwise associated with an infant maturity status at step 524. Accordingly, if the intended destination is in the infant table 220 and/or is otherwise associated with an infant maturity status, the method 500 may proceed to step 528 where the information associated with the intended destination is removed from the infant table 220 and placed in the in the child table 228. The communication received internally may then be forwarded at step 516 to the intended destination and the method 500 may end at step 520. Alternatively, if the intended destination is not in the infant table 220 and/or is otherwise not associated with an infant maturity status, the method 500 may proceed to step 532 where the information associated with the intended destination is placed in the in the adult table 236. Moreover, identifying information associated with the destination (e.g., IP address of the intended destination), may be entered into the known good table 238.

External traffic that is associated with an entry in the infant table 220 and/or the child table 220 is subjected to additional traffic analysis and/or traffic rate mitigation techniques. For example, traffic from an external computing device, such as 104E, may be rate limited, packet limited, or otherwise clipped in order to potentially limit any effects of nefarious activity until such communication can be confirmed as legitimate or otherwise matures to an adult maturity status. Continuing from step 536, at step 540 of FIG. 5B, the method 500 may proceed to determine if the source identification information is associated with an entry in the infant table 220 and/or is otherwise associated with an infant maturity status. If it is determined that the source information is already associated with an infant maturity status, then the communication may be reevaluated and/or dropped. In instances where step 544 is invoked, often times a destination device may be bombarded with communication attempts in an effort to overwhelm the destination device and cause the destination device to fail in some manner. Accordingly, to prevent such activity, identifying information originating from an external source and being associated with an infant maturity status typically indicates that the destination device has not yet responded to the initial communication form the external source. Such behavior may correspond to the external source sending multiple packets of information in a very quick manner. Accordingly, such information may be dropped from being forwarded to the destination device. In other instances, the destination device may not have responded to legitimate communications from the external source; accordingly, such communications may be held for a period of time and then reevaluated against external source identification information found in the infant table 220 and child table 228.

If the identifying information in the communication corresponds to a child maturity status, then the identifying information in the communication is removed from the child table 220 and placed in the adult table 236 at step 564. Alternatively, or in addition, the identifying information is associated with an adult maturity status. Furthermore, the identifying information (source IP) may be provided to a known good table 238 to either be added to the table or to have session count associated with the identification information incremented. Method 500 may proceed to step 560 where the information is subjected to additional traffic analysis and/or traffic rate mitigation techniques and forwarded to the destination device at step 560. Method 500 may end at step 548.

As depicted in FIG. 5B, if the identification information in the communication is not associated with a child maturity status or otherwise found in the child table 228, the method 500 may proceed to step 556 where the identification information may be associated with an infant maturity status and/or where the identification information may be entered into the infant table 220. The communication may then be transmitted to the destination device in a traffic and is subject to additional traffic analysis and/or traffic rate mitigation techniques.

Figure 6:
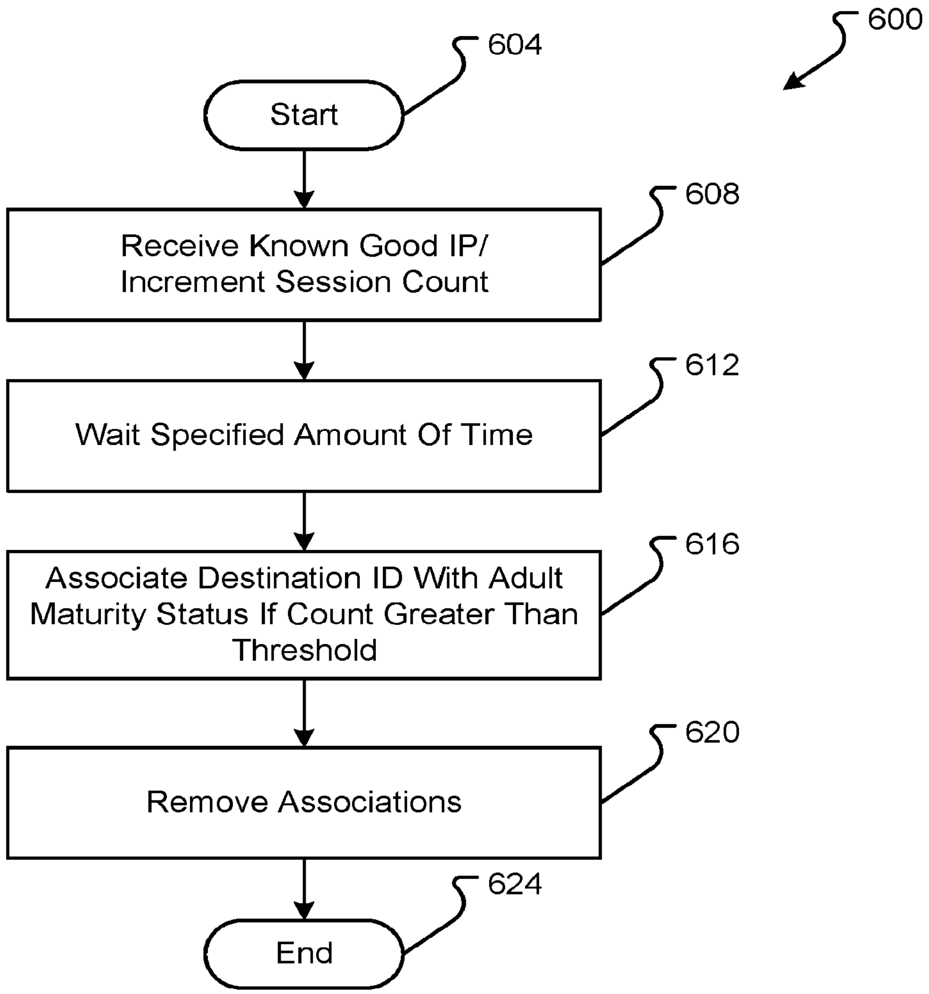
FIG. 6 illustrates a method for establishing and resetting a known good source/destination table in accordance with the aspects of the disclosure.

FIG. 6 depicts details of a method 600 for implementing known good IP address monitoring in accordance with aspects of the present disclosure. A general order for the steps of the method 600 is shown in FIG. 6. Generally, the method 600 starts with a start operation 604 and ends with an end operation 624. The method 600 can include more or fewer steps or can arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

Method 600 starts by receiving a known good IP address or otherwise a known good identifier associated with an external computing device. More specifically, method 600 may be implemented at any of steps 532 and/or 562. At least one purpose of method 600 is to identify external source computing devices in which the destination device has previously communicated. More specifically, method 600 identifies external source computing devices in which a threshold number of communication sessions between the destination device and the external source computing device have been performed. Such identified external source computing devices may be referred to as trusted, or otherwise identified as known good external source computing device.

Accordingly, each time identifying information associated with an external source computing device is placed in the adult table 238 or otherwise associated with an adult maturity status, a session count associated with the identifying information is incremented at step 608, or if the identifying information (e.g., IP address) is not in the known good table 238, then the identifying information (e.g., IP address) is placed in the table or otherwise associated with a known good status. After a specified amount of time has passed at step 612, those external source computing devices having communicated with the destination device a threshold number of times or otherwise established a threshold number of communication sessions with the destination device may be inserted into the adult table 236 or otherwise associate with an adult maturity status at step 616. The known good table 238 may then be emptied at step 620 and/or any identification information (e.g., IP address) associated with a known good status may be removed. Method 600 may end at step 624.

As one example, if an IP address is entered into the known good IP table ten times in five seconds, the IP address may be entered into the adult table 236 or otherwise associated with an adult maturity status. Accordingly, as an aging process or idle timeout limit is hit for an entry in the adult table 236, method 600 may provide the ability to maintain known good external source computing devices in the adult table 236 to avoid, or otherwise circumvent, additional traffic analysis and/or traffic rate mitigation techniques.

Figure 7:
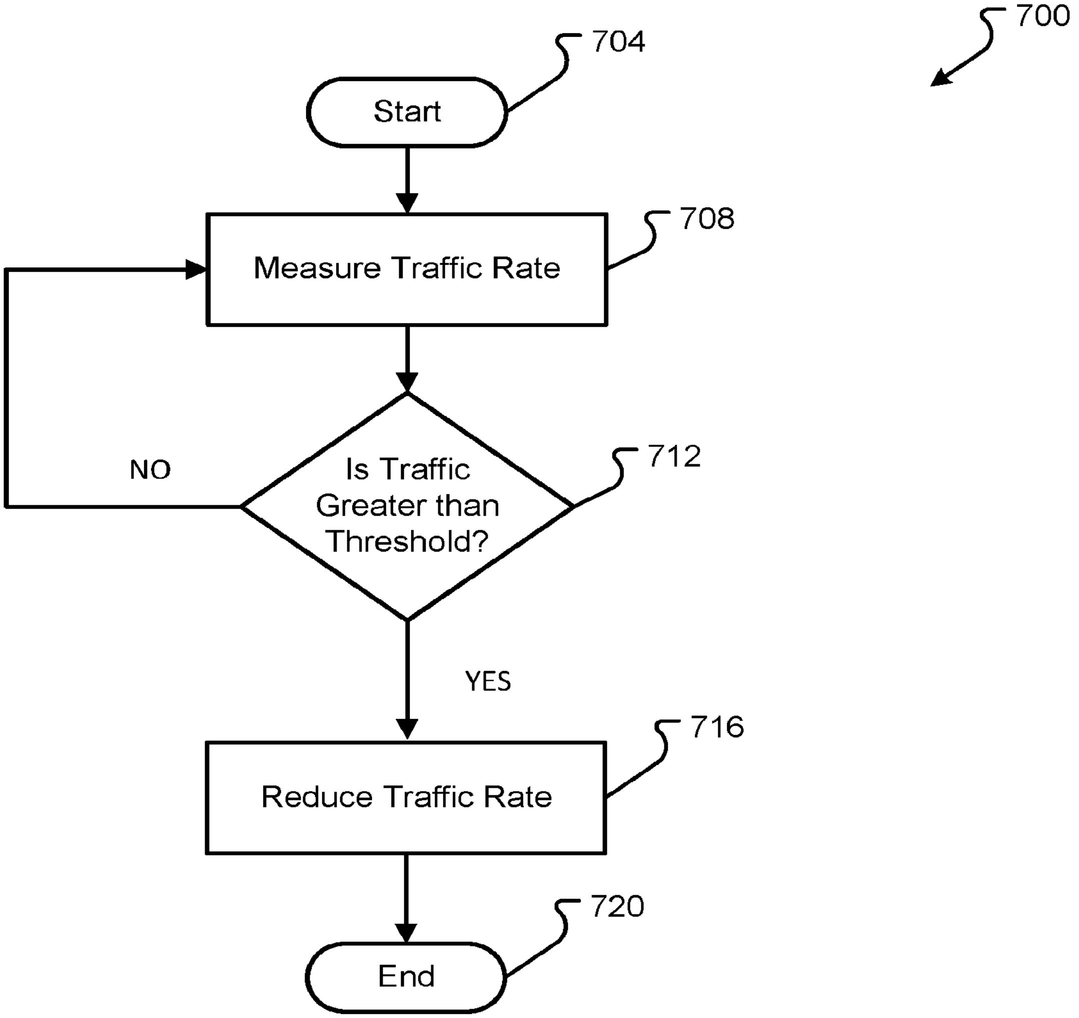
FIG. 7 illustrates a method for performing traffic rate mitigation in accordance with the aspects of the disclosure.

FIG. 7 depicts details of a method 700 for implementing additional traffic analysis and/or traffic rate mitigation techniques. A general order for the steps of the method 700 is shown in FIG. 7. Generally, the method 700 starts with a start operation 704 and ends with an end operation 720. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device.

Hereinafter, the method 700 shall be explained with reference to the systems, components, modules, software, data structures, user interfaces, etc. described in conjunction with FIGS. 1-6.

At step 708, a traffic rate may be measured. For example, a number of packets received, sent, or otherwise may be measured. In some aspects, a number of connections, connection attempts, or otherwise may be measured. If such measured quantities are greater than a threshold, the traffic rate may be reduced by employing a bandwidth limited connection. For example, only a certain number connections may be established or certain number packets may be transmitted between an external source computing device and the destination device.

Figure 8:
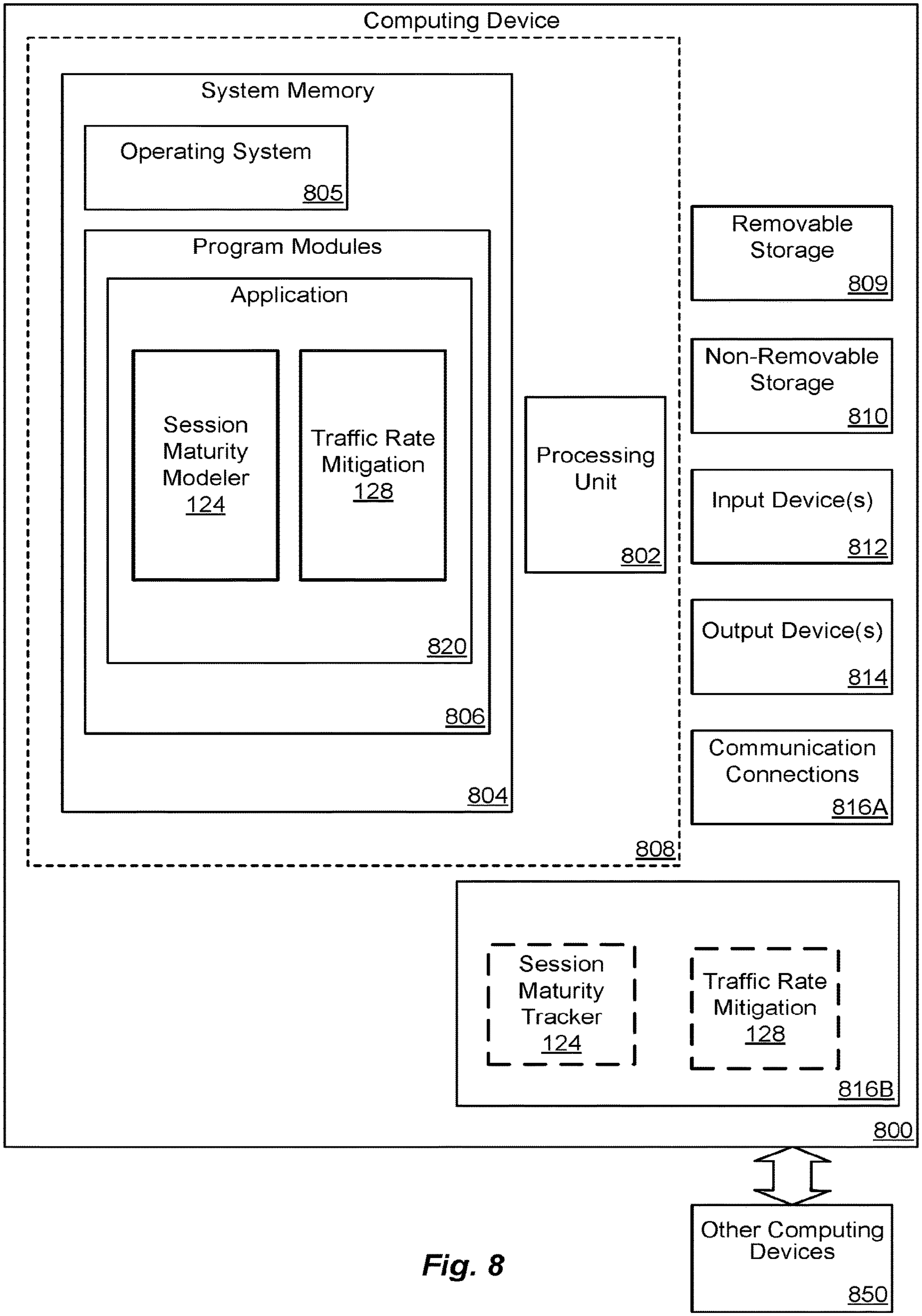
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 808 and one or more program modules 806 suitable for performing the various aspects disclosed herein such as identity provider 824 and attribute inference processor 826. The operating system 808, for example, may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816A allowing communications with other computing devices 880. Examples of suitable communication connections 816A include, but are not limited to, radio frequency (RF) transmitter, receiver, and/or transceiver circuitry; universal serial bus (USB), parallel, network interface card, and/or serial ports. In accordance with aspects of the present disclosure, the computing device 800 may also include a communication connections 816B allowing communications with other computing device 880. More specifically, the communication connections 816B may provide the functionality of the session maturity tracker 124 and the traffic rate mitigation 128 modules. Accordingly, aspects of the present disclosure described herein may be implemented at a network interface card for example.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
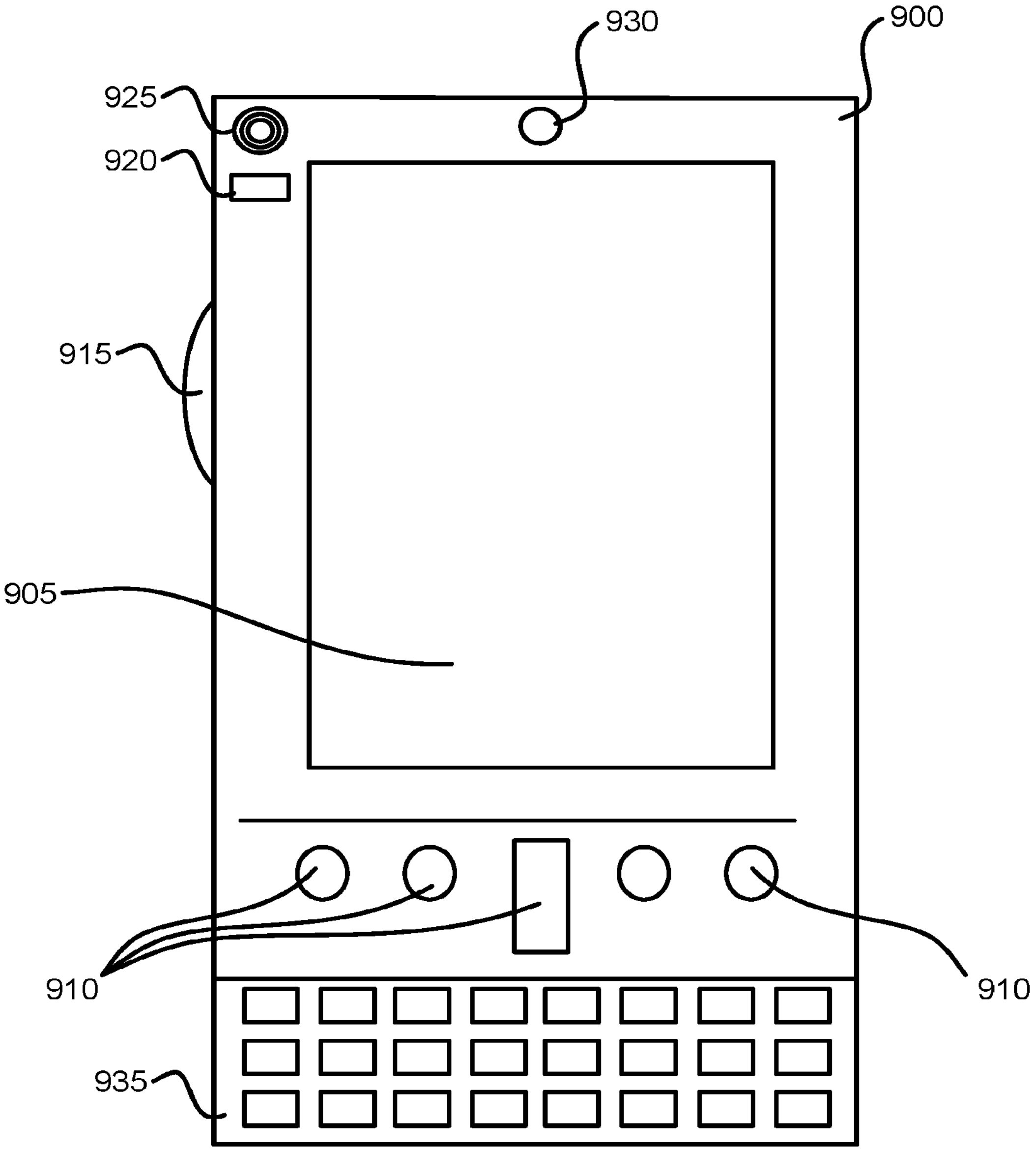
FIG. 9A is a simplified block diagram of a computing device with which aspects of the present disclosure may be practiced.
Figure 9B:
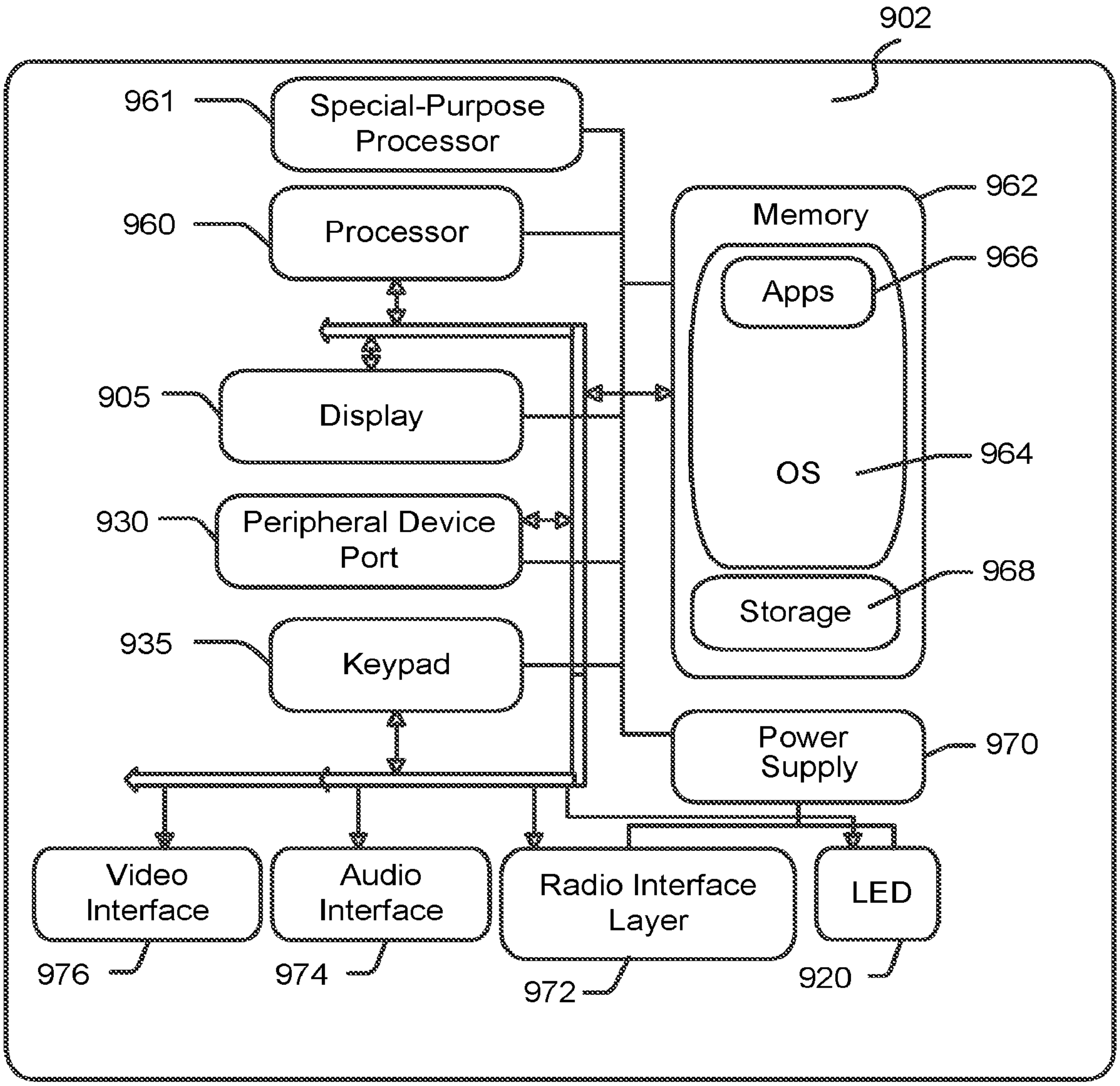
FIG. 9B is another are simplified block diagram of a mobile computing device with which aspects of the present disclosure may be practiced.

FIGS. 9A and 9B illustrate a computing device or mobile computing device 900, for example, a mobile telephone, a smart phone, wearable computer (such as a smart watch), a tablet computer, a laptop computer, and the like, with which aspects of the disclosure may be practiced. In some aspects, the client (e.g., computing system 104A-E) may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external source.

FIG. 9B is a block diagram illustrating the architecture of one aspect of computing device, a server (e.g., server 112), or a mobile computing device. That is, the computing device 900 can incorporate a system (e.g., an architecture) 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
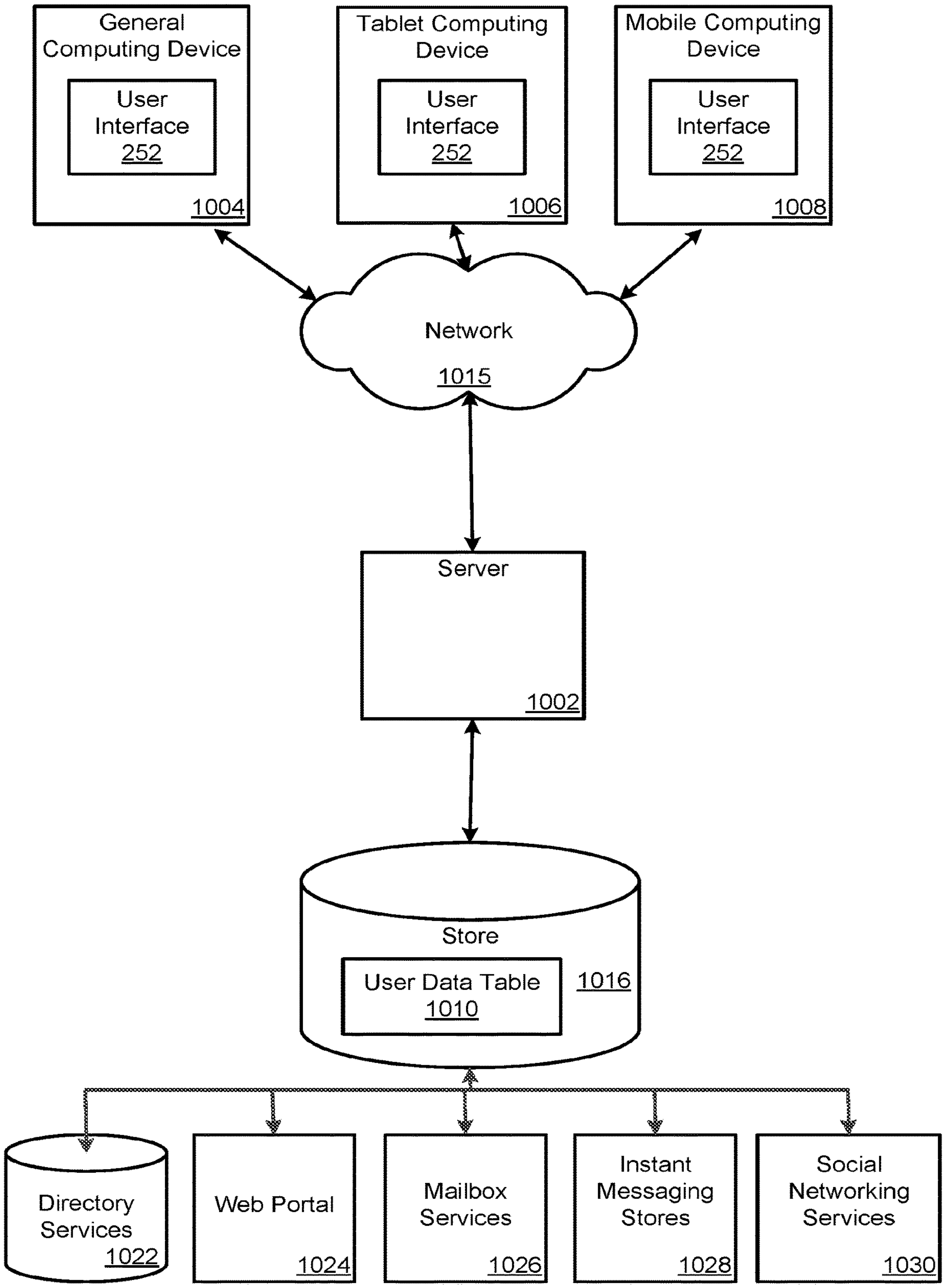
FIG. 10 is a simplified block diagram of a distributed computing system in which aspects of the present disclosure may be practiced.

FIG. 10 illustrates one aspect of the architecture of a system for processing data received at a computing system 1002 (e.g., 116A-118) from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Unified profile API 1021 may be employed by a client that communicates with server device 1002, and/or attribute inference processor 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these configurations of the computing devices may obtain content from the store 1016, in addition to receiving graphical data useable to be either pre-processed at a graphic-originating system, or post-processed at a receiving computing system.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Examples of the present disclosure include a system for tracking a maturity classification of a communication comprising at least one processor, and at least one memory including instructions. The instruction, when executed by the at least one processor, cause the at least one processor to: classify a first communication between a first communication device and a second communication as a non-mature communication classification, subject subsequent communications between the first communication device and the second communication device to at least one of a traffic rate mitigation technique or traffic analysis technique, classify a second communication between the first communication device and the second communication device as a mature communication classification, and bypass the at least one of the traffic rate mitigation technique or the traffic analysis technique for communications between the first communication device and second communication device received after the second communication.

At least one aspect of the present disclosure includes where classifying the first communication as a non-mature communication classification includes associating a first maturity status with identification information from the first communication, and classifying the second communication as a mature communication classification includes associating a second maturity status with the identification information previously associated with the first maturity status. Another aspect of the present disclosure includes where the identification information includes at least one of an IP address of the first communication device, a protocol of the first communication, or a portion associated with the first communication. Yet another aspect of the present disclosure includes where the instructions cause the processor to drop the first communication if the identification information is previously associated with the first maturity status. Further, another aspect of the present disclosure includes where the protocol of the first communication includes at least one of transmission control protocol or user datagram protocol. An aspect of the present disclosure includes where the first communication is received at a device communicatively coupling the first communication device to the second communication device. At least one aspect of the present disclosure includes where the second communication is classified as a mature communication based on a quantity of communications having occurred between the first communication device and the second communication device. Further, an aspect of the present disclosure includes where the second communication is classified as a mature communication based on a quantity of communications having occurred within a threshold period of time. In some aspects of the present disclosure, the first communication is received from the first communication device located external to the second communication device.

Examples of the present disclosure include a method of tracking communication maturity. The method may include: classifying a first communication between a first communication device and a second communication as a non-mature communication classification, subjecting subsequent communications between the first communication device and the second communication device to at least one of a traffic rate mitigation technique or traffic analysis technique, classifying a second communication between the first communication device and the second communication device as a mature communication classification, and bypassing the at least one of the traffic rate mitigation technique or the traffic analysis technique for communications between the first communication device and second communication device received after the second communication.

At least one aspect of the present disclosure includes classifying the first communication as a non-mature communication classification by associating a first maturity status with identification information from the first communication, and classifying the second communication as a mature communication classification by associating a second maturity status with the identification information previously associated with the first maturity status. Another aspect of the present disclosure includes where associating the first maturity status with identification information from the first communication includes determining if the identification information is included in a table corresponding to the first maturity status. At least one aspect of the present disclosure includes where if the identification information is included in the table corresponding to the first maturity status, removing the identification information from the table and modifying a second table corresponding to the second maturity status to include the identification information. Another aspect of the present disclosure includes dropping the first communication if the identification information is included in the table corresponding to the first maturity status. Yet another aspect of the present disclosure includes classifying the second communication as a mature communication classification based on a quantity of communications having occurred between the first communication device and the second communication device within a threshold period of time.

Examples of the present disclosure include a system for tracking a maturity classification of a communication including at least one processor, and at least one memory including instructions which when executed by the at least one processor, causes the at least one processor to: classify a first communication received from a communication device as a non-mature communication classification, subject subsequent communications received from the communication device to at least one of a traffic rate mitigation technique or traffic analysis technique, classify a second communication received from the communication device as a mature communication classification, and bypass the at least one of the traffic rate mitigation technique or the traffic analysis technique for communications received from the communication device.

An aspect of the present disclosure includes where the instructions cause the processor to send a third communication to the communication device, the third communication being sent after the first communication. At least one aspect of the present disclosure includes where classifying the first communication as a non-mature communication classification includes associating a first maturity status with identification information from the first communication, and classifying the second communication as a mature communication classification includes associating a second maturity status with the identification information previously associated with the first maturity status. Further still, at least one aspect of the present disclosure includes where the identification information includes at least one of an IP address of the communication device, a protocol of the first communication, or a port associated with the first communication. Another aspect of the present disclosure may include where the second communication is classified as a mature communication based on a quantity of communications received from the communication device.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A system for tracking a maturity classification of a communication comprising:
- at least one processor; and
- at least one memory including instructions which when executed by the at least one processor, causes the at least one processor to:
- determine a first communication between a first communication device and a second communication device to be an internal communication or an external communication;
- based on the first communication being an internal communication, classify the first communication between a first communication device and a second communication device as a mature communication classification in one or more tables, wherein mature communication are intended, valid, or otherwise wanted communications;
- based on the first communication being an external communication, classify the first communication between a first communication device and a second communication as a non-mature communication classification;

based at least partially on the first communication being non-mature, subject subsequent communications between the first communication device and the second communication device to at least one of a traffic rate mitigation technique or traffic analysis technique;

classify a second external communication between the first communication device and the second communication device as a mature communication classification; and bypass the at least one of the traffic rate mitigation technique or the traffic analysis technique for communications between the first communication device and second communication device received after the mature communication classification and based on the mature communication classification.

2. The system of claim 1, wherein classifying the first communication as a non-mature communication classification includes associating a first maturity status with identification information from the first communication, and classifying the second communication as a mature communication classification includes associating a second maturity status with the identification information previously associated with the first maturity status.

3. The system of claim 2, wherein the identification information includes at least one of an IP address of the first communication device, a protocol of the first communication, or a portion associated with the first communication.

4. The system of claim 3, wherein the instructions cause the processor to drop the first communication if the identification information is previously associated with the first maturity status.

5. The system of claim 3, wherein the protocol of the first communication includes at least one of transmission control protocol or user datagram protocol.

6. The system of claim 1, wherein the first communication is received at a device communicatively coupling the first communication device to the second communication device.

7. The system of claim 1, wherein the second communication is classified as a mature communication based on a quantity of communications having occurred between the first communication device and the second communication device.

8. The system of claim 6, wherein the second communication is classified as a mature communication based on a quantity of communications having occurred within a threshold period of time.

9. The system of claim 1, wherein the first communication is received from the first communication device located external to the second communication device.

10. A method of tracking communication maturity comprising:

determining a first communication between a first communication device and a second communication device to be internal or external;

based at least partially on the first communication being internal, classifying a first communication between a first communication device and a second communication device as a mature communication classification in one or more tables, wherein mature communication are intended, valid, or otherwise wanted communications;

based at least partially on the first communication being external, classifying a first communication between a first communication device and a second communication as a non-mature communication classification;

based at least partially on the first communication being non-mature, subjecting subsequent communications between the first communication device and the second communication device to at least one of a traffic rate mitigation technique or traffic analysis technique;

classifying a second communication between the first communication device and the second communication device as a mature communication classification; and bypassing the at least one of the traffic rate mitigation technique or the traffic analysis technique for communications between the first communication device and second communication device received after the mature communication classification and based on the mature communication classification.

11. The method of claim 10, further comprising:

classifying the first communication as a non-mature communication classification by associating a first maturity status with identification information from the first communication; and classifying the second communication as a mature communication classification by associating a second maturity status with the identification information previously associated with the first maturity status.

12. The method of claim 11, wherein associating the first maturity status with identification information from the first communication includes determining if the identification information is included in a table corresponding to the first maturity status.

13. The method of claim 12, wherein if the identification information is included in the table corresponding to the first maturity status, removing the identification information from the table and modifying a second table corresponding to the second maturity status to include the identification information.

14. The method of claim 12, further comprising dropping the first communication if the identification information is included in the table corresponding to the first maturity status.

15. The method of claim 10, further comprising classifying the second communication as a mature communication classification based on a quantity of communications having occurred between the first communication device and the second communication device within a threshold period of time.

16. A system for tracking a maturity classification of a communication comprising:

at least one processor; and at least one memory including instructions which when executed by the at least one processor, causes the at least one processor to:

determine a first communication between a first communication device and a second communication device to be internal or external;

based at least partially on the first communication being internal, classify a first communication between a first communication device and a second communication device as a mature communication classification in one or more tables, wherein mature communication are intended, valid, or otherwise wanted communications;

based at least partially on the first communication being external, classify a first communication received from a communication device as a non-mature communication classification, based at least partially on the first communication being non-mature, subject subsequent communications received from the communication device to at least one of a traffic rate mitigation technique or traffic analysis technique, classify a second communication received from the communication device as a mature communication classification, and bypass the at least one of the traffic rate mitigation technique or the traffic analysis technique for communications received from the communication device after the mature communication classification and based on the mature communication classification.

17. The system of claim 16, wherein the instructions cause the processor to send a third communication to the communication device, the third communication being sent after the first communication.

18. The system of claim 17, wherein classifying the first communication as a non-mature communication classification includes associating a first maturity status with identification information from the first communication, and classifying the second communication as a mature communication classification includes associating a second maturity status with the identification information previously associated with the first maturity status.

19. The system of claim 18, wherein the identification information includes at least one of an IP address of the communication device, a protocol of the first communication, or a port associated with the first communication.

20. The system of claim 16, wherein the second communication is classified as a mature communication based on a quantity of communications received from the communication device.

* * * * *